INVENTOR
Gerhard Niemitz
BY
ATTORNEYS

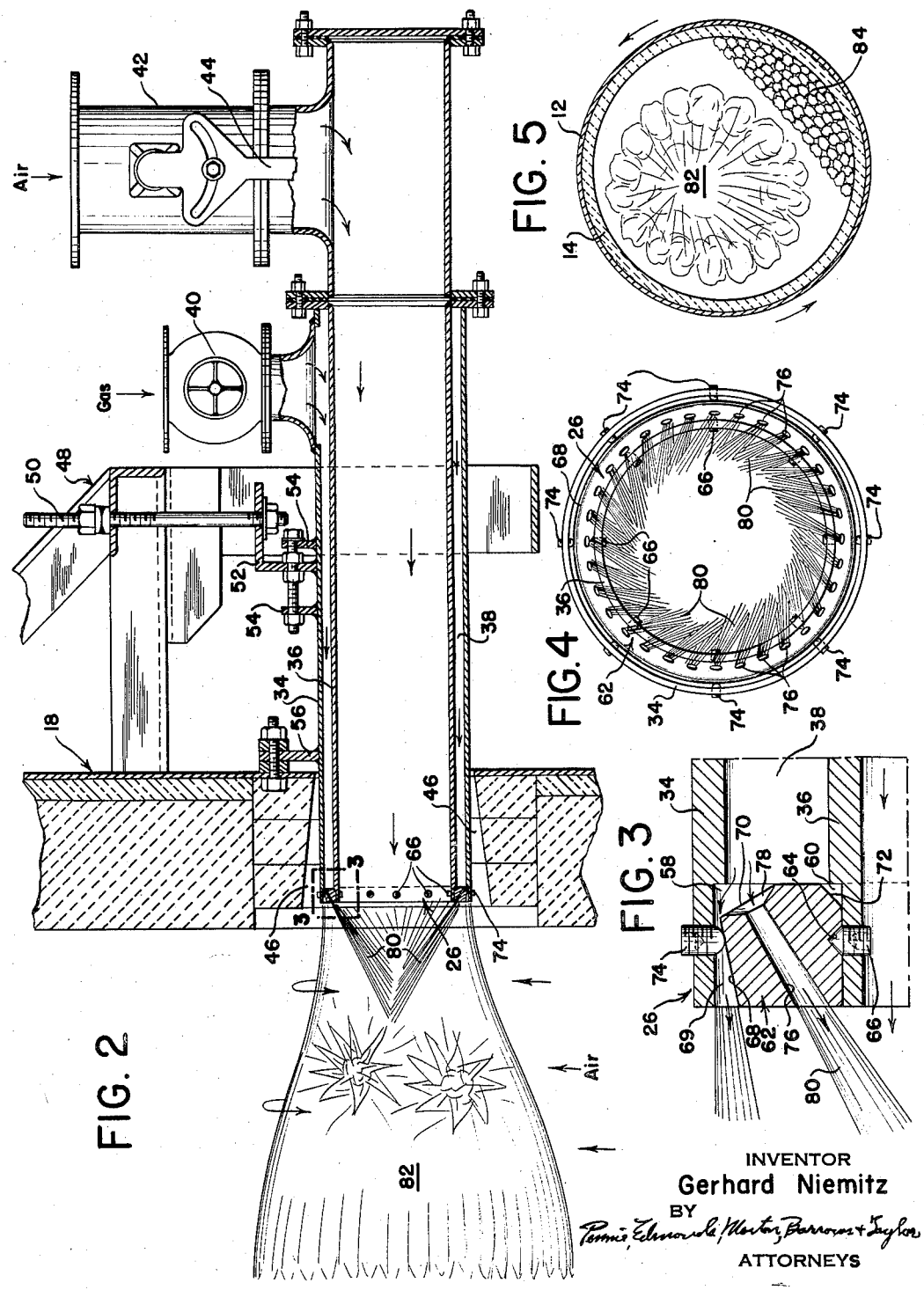

United States Patent Office 2,857,148
Patented Oct. 21, 1958

2,857,148

METHOD OF FIRING ROTARY KILNS AND GAS BURNER THEREFOR

Gerhard Niemitz, Bronx, N. Y., assignor to Kennedy Van Saun Mfg. & Eng. Corporation, New York, N. Y., a corporation of Delaware Application December 2, 1955, Serial No. 550,527

8 Claims. (Cl. 263—33)

My invention relates to improvements in methods of firing rotary kilns, particularly with natural gas and to a burner for handling natural gas in the firing of such kilns for the burning and calcining of raw materials in the production of cement, lime and the like.

Gas burners previously used for firing rotary kilns have varied from simple gas nozzles to pre-mixing type nozzles using varying amounts of air, and they have almost always been used in conjunction with coal or oil burners.

In the operation of rotary kilns, economy dictates maximum recovery of heat from the discharged material, as accomplished by cooling the discharged material with air which in turn is preheated and used as secondary air for combustion. The temperature of this air as discharged from the cooler or preheater is entirely too high to be passed through suction fans or burners. Therefore, the mixing of such high temperature secondary air with gas to be burned must be effected inside the kiln. In prior constructions, however, that has presented a number of difficulties.

In firing rotary kilns, there is an optimum length for the burner flame which is governed by two conditions. One is the maximum obtainable heat transfer from flame to material, which is accomplished best by a short high temperature flame. This condition at the same time results in a low exit gas temperature and a relatively high kiln efficiency. The other condition is that a limitation is set by the fact that excessive flame temperatures cause overburning of the material at the surface and the heating of the kiln refractory to too high a temperature. In all kilns a compromise has to be found resulting in an extension of the flame length in order to distribute the heat over a larger area than would be exposed to the flame when it is at its shortest possible length.

Flame length, when considered in connection with the burning of gas alone, such as natural gas, is a function of the mixing speed of gas and air and the mixing speed depends on the mixing surface and the rubbing velocity of the gas against air. The kinetic energy of a gas stream may be partly conveyed to air by friction, thereby causing mixture and combustion. A high velocity gas stream which does not contain any premixed air has a relatively small mixing surface, since the gas volume is relatively small. This small mixing surface means slow mixing and a long flame. If a small quantity of primary air is premixed with gas in a burner, the resulting gas-air mixture is very rich. Although the larger mass of gas plus primary air being discharged from the burner nozzle results in a larger mixing surface and a higher kinetic energy due to the larger mass, it is not possible to use a high nozzle velocity because the speed of flame propagation in a rich gas mixture is too low. If used in a rotary kiln the resulting flame would not start near the burner nozzle but would begin far back inside the kiln. As a consequence, the length of the resulting flame with small primary air quantities is entirely too long for most rotary kiln applications. However, increase of primary air beyond a certain practical maximum is to be avoided. For one reason, an insufficient proportion of the total air would be available as secondary air for the cooling of the calcined material in the cooler or air preheater, without a loss in efficiency.

Where natural gas or other fuel gas has been used in rotary kilns, it has usually if not always been in conjunction with oil or pulverized coal in order to provide adequate flame radiation. The reason why adequate flame radiation has not been obtained with gas alone may be due to burner construction or method of firing, or because present burners produce low-radiating blue flames. It has been found that secondary combustion at a very high temperature is essential for adequate radiation, but it is impossible to use mixers or known burners because of backfiring. Attempts have been made to overcome the difficulties encountered in the burning of natural gas in rotary kilns by using multiple mixing nozzles in the firing hood of the rotary kiln. While such multiple nozzle arrangements increase the degree of mixing to a certain extent, the burners or nozzle arrangements have been such that they cause impingement of the flames on the nose ring of the kiln, overheating of the firing hood and impingement of the burner flames on the material in the kiln with corresponding skin overheating. These drawbacks have not been eliminated by known gas burner arrangements.

The primary object, therefore, of the present invention is to provide a method of firing rotary kilns with fuel gas such as natural gas in such a manner that the various difficulties previously encountered are overcome.

A further object of the invention is to provide a method of firing with natural gas which will provide an adequate high temperature in the discharge end of the kiln and a flame which extends into the kiln the proper distance without impingement and overburning the material being calcined.

Another object of the invention is to provide an improved gas burner construction for rotary kilns adapted to provide the sole source of heat for the rotary kiln.

In accordance with the invention it has been discovered that if the natural gas to be burned is supplied to the firing hood of the rotary kiln in a burner providing two distinct gas delivery means, one delivering an uninterrupted annular thin stream of gas of considerable diameter and velocity exposed to a surrounding envelope of hot secondary air, and the other delivering a multiplicity of inwardly-directed small high velocity gas jets inside the annular gas stream and into a stream of primary combuston air inside the annular gas stream, a substantially ideal heating condition is achieved in the rotary kiln without the use of powdered coal or oil along with the natural gas.

The means for delivering the multiplicity of inwardly-directed jets of fuel gas is arranged to provide an annular series of gas jets for distributing gas over the cross-sectional area inside the annular stream of gas, which comprises an annular mantle. Primary air is forced under pressure through the burner structure into the space inside the annular gas mantle where it mixes with the gas from the small gas jets or nozzles and with part of the gas on the inner surface of the mantle because of internal friction between the gas mantle and the stream of primary air.

Only a fraction of the total gas quantity to be burned is mixed with the primary air so that an explosive mixture can be created by adjusting the quantity or proportion of primary air with respect thereto. This means the production of a very short flame inside the annular gas mantle. Expansion of the air-gas mixture inside the annular gas mantle during the combustion process forces the thin gas mantle apart explosively thereby creating an intimate mixture between the gas stream forming the gas mantle and the surrounding hot secondary air. This mixing and the corresponding intense combustion resulting therefrom, takes place inside the kiln itself and inside the nose ring of the kiln. The length of the resulting flame in the kiln, for constant gas quantity, can be regulated over a wide range simply by adjusting the proportion of primary air which is being fed to the multiplicity of gas jets of the burner. Furthermore, the shape of the flame can be maintained sufficiently restricted to avoid impingement on the refractory of the kiln or on the material being heated in the kiln without in any way affecting the ability of the operator to change the flame length and correspondingly change the heat distribution inside the kiln.

The flame produced by the improved burner and method of heating is so intensely radiant that it is unsafe to look at the flame without the use of dark glasses. This is an important achievement in the burning of natural gas, since ordinarily it is understood that, in order to have a suitably radiant flame in a rotary kiln either oil or powdered coal must be burnt along with the natural gas. The highly radiant character of the flame produced in the present instance by the burning of natural gas alone may be explained by adopting the theory that the intense heat produced and the explosive character of the combustion taking place as the gas envelope is blown apart, together with the rapid mixing of the natural gas of the gas envelope with the surrounding high temperature secondary air causes the production of carbon particles from the hydrocarbons of the natural gas and that these carbon particles in burning account for the radiant character of the resulting flame. The intense radiation might, of course, be accounted for by other theories, but in any case, it is the direct result of the burner construction and method of effecting the combustion of the natural gas.

The importance of using natural gas as fuel in rotary kilns in certain regions can readily be understood from the fact that, in some of these regions, it is posisble to buy natural gas at 15 or 16 cents per million B. t. u., while at the same time it would cost 46 cents to buy an equivalent amount of bunker-C fuel oil.

The improved burner construction and method of heating was recently substituted in a rotary kiln for burning lime in place of a combination gas and oil burner. The highest capacity which had been obtained with the combination oil and gas burner was 120 tons per day, whereas with the new gas burner and firing method according to the present invention a capacity of 150 tons a day was obtained.

The features of the invention are described in detail hereinafter in connection with an embodiment of the invention shown in the accompanying drawings forming a part of this application.

In the drawings:

Fig. 2 is an enlarged broken vertical sectional view of the gas burner shown in Fig. 1.

Fig. 3 is a broken vertical sectional view taken on the line 3—3 of Fig. 2, drawn to a larger scale;

Fig. 4 is a view looking toward the discharge end of the burner shown in Fig. 2 drawn to a larger scale; and Fig. 5 is a vertical sectional view taken on the line 5—5 of Fig. 1 drawn to a smaller scale.

Figure 1:
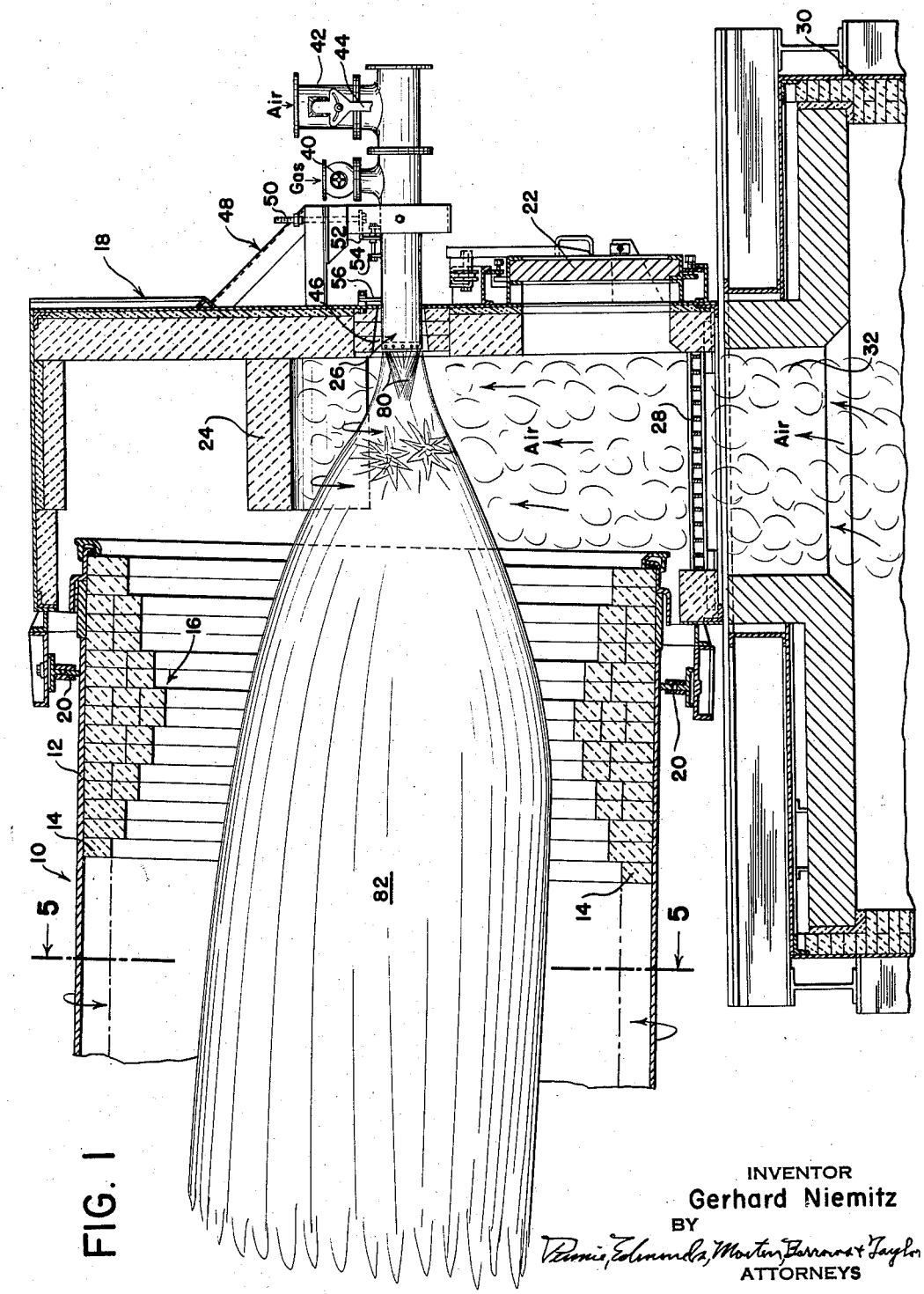
Fig. 1 is a broken view, partly in vertical section, of the discharge end of a rotary kiln.

Referring to Fig. 1 of the drawings, the installation shown therein includes the discharge end portion of a rotary kiln 10 comprising a steel shell 12 lined with refractory brick 14. At the discharge end of the kiln the refractory brick are arranged to provide a nose ring 16 of conventional construction. The kiln includes a firing hood assembly 18, usually carried on wheels and movable toward and away from the discharge end of the kiln. This hood assembly is associated with a conventional type seal 20 and includes a barring door 22 and a curved refractory arch 24 extending entirely across the inside of the hood assembly. A gas burner 26, constructed in accordance with the features of the invention, is mounted in the center of the hood assembly and projects toward the axis of the kiln 10 below the arch 24.

The material heated and calcined in the rotary kiln 10 discharges onto and through a grating 28 and a passageway 32 into the upper portion of a refractory-lined heat exchanger 30, where it is advantageously collected in a body and contacted with cooling air. The resulting air, preheated to a high temperature by contact with the hot calcined material, flows through the passageway 32 and the grating 28 up under the arch 24 around the discharge outlet of the burner 26 and then into the rotary kiln. The inlet end of the kiln is conventionally connected to a stack or exhauster blower which creates a draft through the kiln and aids in drawing the preheated air through the passageway 32 and into the hood assembly. Furthermore, in accordance with conventional practice, the air to be preheated in the heat exchanger 30 is delivered thereto under pressure by a blower and forced through the hot calcined material.

The gas burner 26, shown more in detail in Figs. 2, 3 and 4, comprises concentrically-arranged pipes 34 and 36 mounted in spaced relation to provide an annular passageway 38 for combustible gas, for example, natural gas delivered from a gas main under pressure through a control valve 40. Primary air for supporting combustion is delivered into the pipe 36 through a connection 42 housing a control damper operable by a handle 44.

The pipes 34 and 36 extend almost through a diverging passageway 46 in the refractory of the hood assembly 18, the outer pipe 34 being spaced from the wall of the passageway throughout the length of the passageway, so as to provide a passageway for air to flow in around the pipe 34.

The pipes 34 and 36 are supported by a hanger frame 48 provided with adjustable hanger rods 50 carrying an arcuate-shaped hanger angle member 52 to which spaced plates 54, welded to the pipe 34, are attached. The front end of the pipes 34 and 36 are supported by a plate 56 welded to the pipe 34 and bolted to the back of the firing hood. The rods 50 may be adjusted to aim the burner with respect to the axis of the rotary kiln.

At the discharge end of the burner, the pipes 34 and 36 are machined to provide facing recesses 58 and 60, between which an annular burner tip block 62 is mounted in the manner shown in Fig. 3. This block 62 has an inner circumferential surface which fits the surface of the recess 60, and in which a groove 64 is provided for receiving the tips of retaining studs 66. The outer peripheral surface 68 of the annular block 62 is of smaller diameter than the peripheral surface of the recess 58 and slopes away with respect to the cylindrical peripheral surface of the recess 58 to provide an annular gas flow passageway 69 which increases in cross-sectional flow area toward the outlet of the burner. The block 62 is beveled with a flat bevel at 70 to provide an adequate passageway connecting the annular passageway 38 with the annular diverging passageway 69. The block 62 is also beveled at 72, so that the block is readily positioned by the studs 66 fitting in the annular groove 64. Round-nosed studs 74 are threaded through openings in the pipe 34 into engagement with the surface 68 of the annular block 62, and the studs 74 are used to space the end of the pipe 34 uniformly with respect to the surface 68 of the metal block 62.

The block 62 is provided with a multiplicity of gas-flow orifices or nozzles 76, respectively extending from funnel-shaped gas inlet recesses 78 in the beveled surface 70 and of gradually increasing cross-sectional flow area. These nozzles 76 are each directed inwardly in a direction generally toward a point spaced from the extended axis of the burner, i. e., to one side of said axis in the manner shown in Fig. 4. The direction of forward flow of gas from these nozzles or orifices is illustrated by the gas jets 80, as shown in Fig. 2, while their spiral angular direction of flow to one side of the extended axis of the burner is shown in Fig. 4.

In using the burner construction for firing a rotary kiln, primary air is supplied under pressure from a blower, preferably with some preheating, through the connection 42 to the inner pipe 36. The air through this pipe flows substantially unobstructedly through the discharge end of the burner toward the axis of the kiln. Natural gas, for example, is supplied under pressure through the valve connection 40 to the annular space 38 and flows in the form of an annular jet or stream through the passageway 69 and as individual jets 80 through the multiplicity of nozzles 76. The jets 80 are directed in spiral fashion, as shown in Fig. 4, into the stream of primary air issuing through the pipe 36, where the gas jets produce a whirling spiral action and the gas is burned in an explosive manner, so that the resulting flame and products expand and explode into the annular stream of gas flowing through the passageway 69. This results, as previously described, in the blowing apart of the annular gas stream envelope into the high-temperature air flowing through the grating 28 around the gas envelope or mantle and into the rotary kiln. This flow of high-temperature air is directed around the gas envelope by the arch 24, and as a result, a more or less concentrated forwardly advancing flame 82, as illustrated in Figs. 1 and 2, extends into the discharge end portion of the rotary kiln. The small amount of cool air drawn in through the passageway 46 around the burner aids in cooling the burner and then mingles with the hot air flowing in around the gas envelope.

The gas burner structure is usually made of approximately the correct size and capacity for the particular rotary kiln in which it is to be used, since the gas is supplied through the burner at a substantially constant rate, although variation of the rate of gas supply may be controlled to some extent by the valve 40. In general, however, the gas is supplied to the burner at high pressure, so that it is jetted as an envelope through the channel 69 and as jets through the nozzles 76. With a substantially constant rate of flow of gas through the burner, the combustion is controlled by regulating the air delivered through the pipe 36 and around the gas envelope through the passageway 32. Increase and decrease of air through the passageway 32 may be regulated by the blower used to supply the air to be preheated in the heat exchanger 30. In general, approximately 20% of the total air for combustion is supplied through the burner tube 36, while substantially all of the remaining air is supplied as secondary air around the gas envelope issuing from the annular passageway 69. The gas flowing through the nozzles 76 may be varied from 5 to 15% of the total gas, and, since a relatively short explosive flame is desired inside the gas envelope, the ratio of gas supplied through the nozzles 76 to the primary air supplied through the pipe 36 is preferably approximately 10% gas to 90% air.

The burner produces a very luminous flame adapted to produce temperatures of from 2600° to 2800° F. inside the kiln. The length of this flame may be varied by regulating the proportion of primary air to that of the gas supplied through the annular passageway 69. In general, the flame should extend into the kiln for a distance of from 30 to 40 feet. The flame may be lengthened by slightly reducing the proportion of primary air or shortened by increasing the proportion of primary air. The condition of the flame may be observed through observation doors conventionally provided in the firing hood, and it will be observed that, according to the showing in Fig. 5, the flame produced by the burner installation projects forwardly into the kiln as a concentrated forwardly-moving flame, which does not impinge upon the refractory lining of the kiln or upon the material 84 being heated therein. It is possible to look through the observation doors during operation of the kiln and see entirely along the outside of the flame 82 between it and the refractory lining of the kiln and the material being heated.

In order to give a better understanding of the relationships of the parts of the burner structure shown in Figs. 2, 3 and 4, a particular burner, used successfully in a 10 foot kiln, 150 feet long, had an outside diameter of 10 inches. In this instance, the minimum spacing between the burner ring 62 and the cylindrical surface of the recess 58 was 0.050 inch, which is adapted to give a thin annular gas envelope which keeps its shape for a considerable distance or until blown apart by the combustion and expansion of the gas delivered through the nozzles 76. The ring member 62 of this burner was provided with 32 nozzle orifices 76 having a diameter at their inlet ends of ⅛". This burner uses about 50,000 cu. ft. of gas per hour and the kiln produces about 220 tons of calcined product per day.

I claim:

1. In a rotary kiln for the burning or calcining of raw materials for the production of lime, cement and the like, including a firing hood at the discharge end of the kiln and a gas burner mounted in an opening in the hood facing into the discharge end of the kiln, the improvement in which the gas burner comprises spaced inner and outer concentric tubular members defining an annular gas passageway and extending to the discharge end of the burner, the outer tubular member being spaced from the wall of the opening in the firing hood to define a narrow annular passageway for the flow of air into the kiln around the outer tubular member, an annular burner tip nozzle block located between said tubular members at the discharge end of the burner and provided with a circular series of individual gas nozzle-like passageways each directed forwardly and inwardly at the discharge end of the burner, said annular block being spaced from the outer tubular member to provide a narrow annular gas discharge outlet facing into the kiln at the discharge end of the burner, means for supplying fuel gas into the annular gas passageway between said concentric tubular members for the delivery of fuel gas to said narrow annular gas discharge outlet and to said individual gas nozzle-like passageways in the nozzle block, means for conducting primary air through the inner tubular member into the gas streams from the circular series of gas nozzle-like passageways for the combustion of the fuel gas delivered therethrough, and means for conducting secondary air into the lower portion of the firing hood and around the periphery of the gas stream discharged through the narrow annular gas discharge outlet.

2. In a gas burner including spaced inner and outer concentric tubular members defining an annular gas supply passageway and extending to the discharge end of the burner, the improvement comprising an annular burner tip nozzle block mounted between said tubular members at the discharge end of the burner and provided with a circular series of individual gas nozzle-like passageways each directed forwardly and inwardly at the discharge end of the burner, said annular block being spaced from the outer tubular member to provide a narrow annular gas discharge outlet passageway at the discharge end of the burner, means for supplying fuel gas into the annular gas passageway between said concentric tubular members for the delivery of fuel gas to said narrow annular gas discharge outlet and to said individual gas nozzle-like passageways in the nozzle block, means for conducting primary air through the inner tubular member into the gas streams from the circular series of gas nozzle-like passageways for the combustion of the fuel gas delivered therethrough, and means for conducting secondary air around the periphery of the gas stream discharged through the narrow annular gas discharge outlet.

3. A gas burner as claimed in claim 2, in which the inner periphery of the annular nozzle block is located in engagement with the outer periphery of the inner tubular member.

4. A gas burner as claimed in claim 2, in which the annular gas discharge outlet passageway and the individual passageways gradually increase in cross-sectional area toward the discharge end of the burner.

5. A gas burner as claimed in claim 2, in which each of said individual nozzle-like passageways are directed at an angle with respect to the axis of the nozzle block and toward a point spaced radially from the extended axis of the nozzle block.

6. A gas burner as claimed in claim 2, in which the individual gas nozzle-like passageways are directed forwardly and inwardly at the same rotational angle, each of the individual gas passageways being directed in the same rotational direction toward a point radially offset with respect to the extended axis of the annular gas discharge passageway, whereby a whirling action is created in the primary air delivered through the inner tubular member.

7. The method of firing rotary kilns with fuel gas, comprising delivering an annular stream of fuel gas of relatively large diameter to the kiln at its discharge end, delivering a multiplicity of individual fuel gas streams forwardly into the discharge end of the kiln directly inside the delivery point of said annular gas stream, each of said individual gas streams being directed inwardly with respect to the annular gas stream, delivering preheated secondary air around the surface of the annular gas stream, and delivering a stream of primary air into said multiplicity of gas streams for the combustion of the fuel gas thereof within the confines of the annular gas stream, whereby combustion of the fuel gas of the individual gas streams causes a rapid expansion and rupture of the annular gas stream into the preheated secondary air delivered around the annular gas stream.

8. The method of firing rotary kilns as claimed in claim 7, in which each of the individual gas streams is directed forwardly and inwardly toward a point spaced radially with respect to the axis of the annular gas stream, the individual streams of fuel gas being directed at the same rotational angle with respect to the axis of the annular gas stream, whereby a whirling action is obtained in the primary air and the individual gas streams are thoroughly mixed with the primary air.

References Cited in the file of this patent

UNITED STATES PATENTS

| | | |
|---|---|---|
| 1,006,324 | Werner | Oct. 17, 1911 |
| 1,805,066 | Andrieux | May 12, 1931 |
| 2,034,932 | Whitcomb et al. | Mar. 24, 1936 |
| 2,301,017 | Cherry | Nov. 3, 1942 |
| 2,375,487 | Newhouse | May 8, 1945 |
| 2,567,485 | Jenny | Sept. 11, 1951 |

FOREIGN PATENTS

| | | |
|---|---|---|
| 673,827 | Great Britain | Jan. 26, 1949 |